United States Patent Office 3,529,875
Patented Sept. 22, 1970

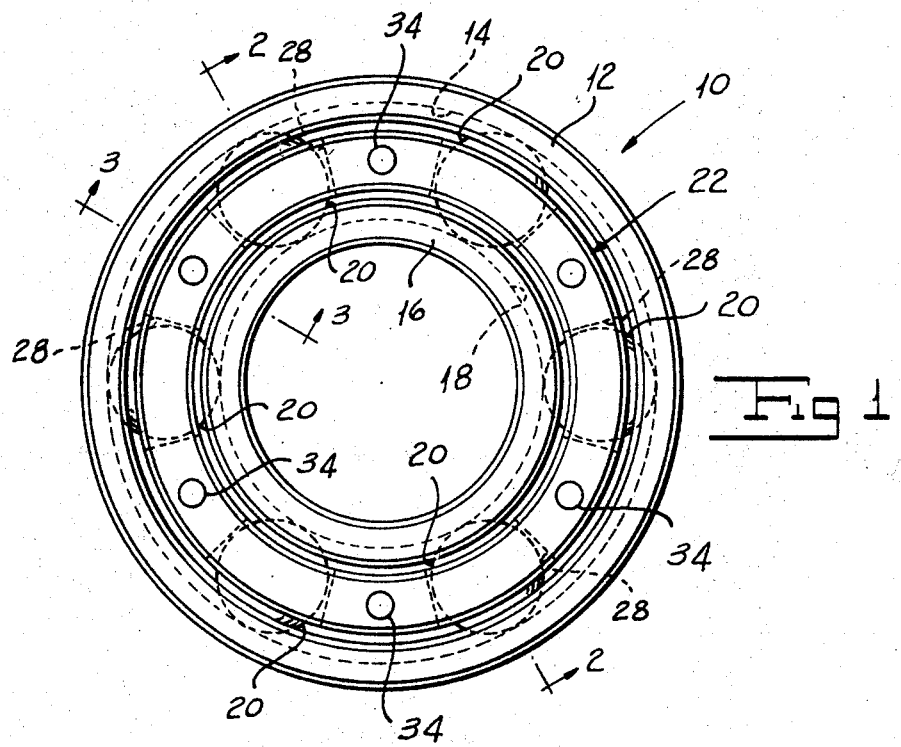
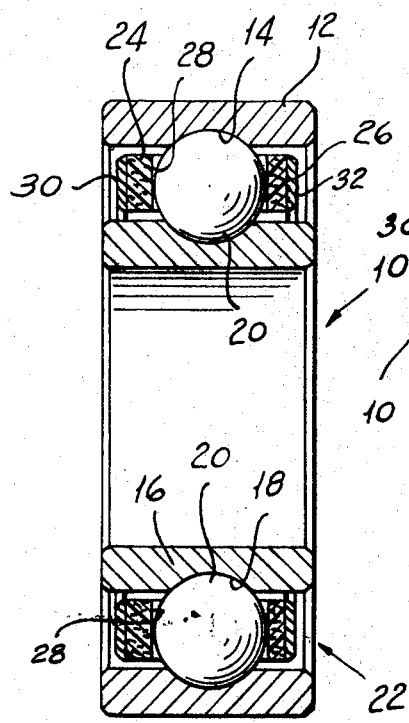
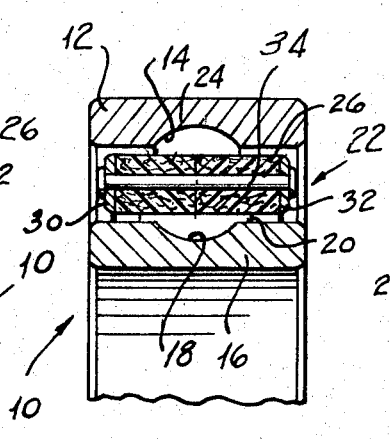
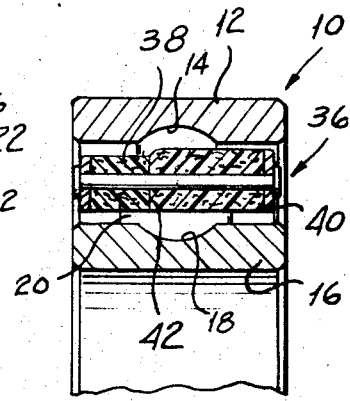

---

3,529,875
REINFORCED LUBRICATING BALL BEARING CAGE
Lewis W. McKee, Brookfield, Conn., assignor to The Barden Corporation, Danbury, Conn., a corporation of Connecticut
Filed Dec. 20, 1968, Ser. No. 785,473
Int. Cl. F16c 33/38
U.S. Cl. 308—201                                    10 Claims

ABSTRACT OF THE DISCLOSURE

A ball bearing cage in which respective annular reinforcing plates of relatively rigid material are bonded to the outer sides of two ball pocket-forming parts of a split central annular body of porous resin impregnated fibrous material capable of absorbing between about eight percent and about ten percent by weight of a liquid lubricant such as oil. The two parts are retained in assembled relationship and are further reinforced by any suitable means such, for example, as axially extending rivets. The bodies may have different outer diameters to allow excess lubricant to escape and may have different axial thicknesses to provide a parting line which is out of contact with the bearing balls.

BACKGROUND OF THE INVENTION

One of the most serious problems in the use of bearings, such as ball bearings, is to provide proper lubricant so that the bearing will have a minimum of friction and will have a relatively long life. Various proposals have been made in the prior art for self-lubricating bearings. By way of example, some bearings of the prior art are provided with wicks which carry lubricant into the space between the bearing rings so that the lubricant is picked up by the balls as they roll on the raceways. Other suggestions have been made for self-lubrication of bearings as by providing an oil-carrying packing in the space between the balls. Perhaps the most advanced suggestion for self-lubrication of bearings is to provide a ball separator which may itself carry lubricant in some form so as to permit the balls to pick up the lubricant as they roll in the bearing raceways.

While the arrangements proposed in the prior art for self-lubrication of bearings have met with varying degrees of success, all of them embody defects. Many of them are difficult to construct and, consequently, are too expensive to permit their use for ordinary production line bearings. Self-lubricating bearing separators or cages of the prior art either are not sufficiently strong or they do not carry an adequate supply of lubricant, or they are too expensive for ordinary use.

I have invented a lubricating ball bearing cage which overcomes the defects of self-lubricating bearing arrangements of the prior art. My cage holds a relatively large supply of lubricant. It is sufficiently strong structurally as to have a long useful life. It is simple in construction and, consequently, is relatively inexpensive.

SUMMARY OF THE INVENTION

One object of my invention is to provide a lubricating ball bearing cage which overcomes the defects of self-lubricating bearing arrangements of the type known in the prior art.

Another object of my invention is to provide a lubricating ball bearing cage which holds a relatively large supply of lubricant.

A further object of my invention is to provide a lubricating ball bearing cage which is sufficiently strong as to have a relatively long life in ordinary use.

Other and further objects of my invention will appear from the following description.

In general my invention contemplates the provision of a reinforced lubricating ball bearing cage in which two annular parts of a split central annular body having ball pockets therein are formed from a porous resin impregnated fibrous material capable of absorbing between about eight percent and about ten percent by weight of a liquid lubricant such as oil. Annular reinforcing plates are bonded to the outsides of the respective parts. The two parts are assembled by means such as axially extending rivets to form the cage and further to reinforce the cage in a direction perpendicular to the assembly parting line. I may make the two parts of different diameters so as to facilitate the escape of excess oil from the outer race. Further one of the parts may be thicker than the other in an axial direction to provide a parting line out of contact with the bearing balls.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a side elevation of a ball bearing which is provided with my reinforced lubricating cage.

FIG. 2 is a sectional view of the bearing illustrated in FIG. 1 taken along the line 2—2 of FIG. 1.

FIG. 3 is a fragmentary sectional view of the bearing illustrated in FIG. 1 taken along the line 3—3 of FIG. 1.

FIG. 4 is a fragmentary sectional view of a bearing provided with a modified form of my reinforced lubricating ball bearing cage.

DESCRIPTION OF THE PREFERRED EMBODIMENT

Referring now to the drawings, a bearing indicated generally by the reference character 10, which may for example be of the deep groove type, includes an outer ring 12 formed with a ball receiving raceway 14. Bearing 10 further includes an inner ring 16 having a raceway 18 which cooperates with the outer ring raceway 14 in receiving balls 20.

I provide the bearing 10 with my improved lubricating cage, indicated generally by the reference character 22. Cage 22 includes a split annular central body made up of two parts 24 and 26, which in the form of my cage shown in FIG. 1 are halves of the central body. When the two halves are assembled, openings therein cooperate to form ball receiving pockets 28 so as to hold the balls 20 in spaced relationship around the bearing 10. I form each of the bodies 24 and 26 from a porous resin impregnated fibrous material having the capability of absorbing a relatively large quantity of liquid lubricant such as oil. This material should be capable of absorbing at least five percent by weight of oil. Preferably, it is able to absorb between eight percent and ten percent by weight of oil. One material which I have found to be particularly well suited to the manufacture of the two halves 24 and 26 is "Duroid 800," which is a paperboard product formed from kraft cellulose fiber with a beater-addition of phenol-formaldehyde resin, manufactured and sold by Rogers Corporation of Rogers, Conn. The halves 24 and 26 manufactured of this material have the ability of absorbing from eight percent to ten percent by weight of oil.

While the porous resin impregnated fibrous material has excellent oil absorbing properties, it is not per se sufficiently rigid structurally to form a suitable bearing cage. I bond respective annular reinforcing plates 30 and 32 to the outer surfaces of the respective halves 24 and 26. These plates may be made of any material which is relatively rigid as compared with the fibrous material of which the halves 24 and 26 are formed. They may, for example, be made of glass fiber or fabric reinforced epoxy resin, or of a metal or any other suitable material. Moreover any suitable binder, such as phenolic resin adhesive or an epoxy or the like, may be used to bond the plates 30 and 32 to the outer sides of the halves 24 and 26.

I employ any appropriate means to hold the two halves 24 and 26 of the cage 22 in assembled relationship. For example, I may use axially extending rivets 34 of aluminum or the like. These rivets 34 not only hold the two halves in assembled relationship but, also, they provide a further reinforcement for the material of which the halves are formed in planes parallel to the parting line along which the two halves are joined.

Referring to FIG. 4, I have shown a modified form of my cage, indicated generally by the reference character 36 in use on the bearing 10. The cage 36 includes two parts 38 and 40 formed of the same material as are the halves 24 and 26 but made so that the part 38 has a smaller outer diameter than does the part 40. Owing to this construction, excess lubricant may flow axially outwardly to escape from the outer raceway. In addition to the feature just described which permits excess lubricant to escape, I so form the parts 38 and 40 of different axial thicknesses to provide a parting line 42 which is off-center. The purpose of the off-center parting line is to cause the circumference of the balls 20 to bear on solid material rather than to bear on the halves at the parting line.

In applying my cage 22 to a deep groove bearing, such as the bearing 10, I first bond the reinforcing plates 30 and 32 to the sheet material. I next form the respective halves 24 and 26 from the sheet material. They may be retained in assembled relationship by means, such as rivets 34, which provide additional reinforcement in planes perpendicular to the axis of rotation of the bearing. Next, the ball pocket openings 28 are formed in the assembly. Alternatively the halves 24 and 26 might be so made as to form openings 28 when they are assembled. If desired, I may incorporate in the cage the two features of the form of my cage illustrated in FIG. 4 which allows escape of excess lubricant and which causes the balls to bear on solid material rather than on the parting line of the two parts 38 and 40.

It will be seen that I have accomplished the objects of my invention. I have provided a reinforced lubricating ball bearing cage which overcomes the defects of self-lubricating bearing systems of the prior art. My cage is adapted to absorb and hold a large supply of a liquid lubricant such as oil. It is sufficiently strong as to have a relatively long life. It is simple to construct and is inexpensive to manufacture.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A ball bearing cage including in combination, an inner annular body of porous resin impregnated fibrous material, having sides generally perpendicular to the central axis of the annulus formed by the body and respective annular reinforcing plates of relatively rigid material secured to said sides.

2. A ball bearing cage as in claim 1 in which said porous material holds between about eight percent and about ten percent by weight of a lubricant.

3. A ball bearing cage as in claim 1 in which said annular body comprises two rings and means for holding said rings in assembled relationship to form the annular body.

4. A ball bearing cage as in claim 3 in which said means for holding said rings in assembled relationship comprises a fastener extending generally parallel to said axis.

5. A ball bearing cage as in claim 4 in which said fastener is a rivet.

6. A ball bearing cage as in claim 1 in which said porous material comprises cellulose fibers and phenolformaldehyde resin.

7. A ball bearing cage including in combination, respective rings of porous resin impregnated fibrous material capable of absorbing from about eight percent to about ten percent by weight of oil, said rings adapted to be assembled in side-by-side relationship along a parting line to form a plurality of ball pockets, respective annular reinforcing plates of relatively rigid material secured to the outer sides of said rings and fasteners extending through said rings in a direction generally parallel to the axis thereof for holding said rings in assembled relationship.

8. A ball bearing cage as in claim 7 in which one of said rings has a larger outside diameter than does the other.

9. A ball bearing cage as in claim 7 in which one of said rings is wider in the direction of said axis than is the other whereby said parting line is off center.

10. A ball bearing cage as in claim 7 in which one of said rings has a larger outside diameter than does the other and in which one of said bodies is wider in the direction of said axis than is the other.

References Cited

UNITED STATES PATENTS 3,162,493   12/1964   Hanan _____ 308—201

MARTIN P. SCHWADRON, Primary Examiner

F. SUSKO, Assistant Examiner